United States Patent
Poulson et al.

(10) Patent No.: US 7,114,318 B2
(45) Date of Patent: *Oct. 3, 2006

(54) HEIGHT-OF-CUT ADJUSTMENT SYSTEM FOR REEL MOWER

(75) Inventors: Eric Alan Poulson, Paradise, UT (US); Mark Alvin Schmidt, Charlotte, NC (US); Mitchel R. Torrie, Hyrum, UT (US); Ronald Lee Reichen, Raleigh, NC (US); Richard David Thier, Juneau, WI (US); John Michael Flenniken, Rock Hill, SC (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/427,721

(22) Filed: Apr. 30, 2003

(65) Prior Publication Data

US 2004/0216438 A1 Nov. 4, 2004

(51) Int. Cl.
*A01D 34/53* (2006.01)
(52) U.S. Cl. ........................................................ 56/249
(58) Field of Classification Search ............ 56/10.2 R, 56/10.4, 10.2 D, 249, 251, 294, DIG. 20
See application file for complete search history.

(56) References Cited

U.S. PATENT DOCUMENTS

| | | | | |
|---|---|---|---|---|
| 3,918,239 A | * | 11/1975 | Aldred et al. | ......................... 56/7 |
| 3,977,163 A | * | 8/1976 | Olin et al. | ......................... 56/7 |
| 4,021,996 A | * | 5/1977 | Bartlett et al. | ......................... 56/7 |
| 4,205,797 A | * | 6/1980 | Bennett et al. | .............. 241/222 |
| 4,335,569 A | | 6/1982 | Keeney et al. | |
| 4,479,346 A | | 10/1984 | Chandler | |
| 4,481,757 A | * | 11/1984 | Tsuchiya | .................... 56/16.9 |
| 4,516,338 A | | 5/1985 | Roe | |
| 4,516,388 A | * | 5/1985 | Chandler | ...................... 56/249 |
| 4,663,924 A | * | 5/1987 | Saiia | .......................... 56/249 |
| 4,680,922 A | * | 7/1987 | Arnold | ............................ 56/7 |
| 4,769,976 A | * | 9/1988 | Bassett et al. | ................... 56/7 |
| 5,083,976 A | * | 1/1992 | McClure et al. | ............... 460/1 |
| 5,197,267 A | * | 3/1993 | Aldred et al. | ................. 56/249 |
| 5,241,810 A | | 9/1993 | Reichen | |

(Continued)

FOREIGN PATENT DOCUMENTS

GB          118038           2/1970

*Primary Examiner*—Árpád Fábián Kovács
(74) *Attorney, Agent, or Firm*—The Law Office of Randall T. Erickson, P.C.

(57) ABSTRACT

A system adjusts the height-of-cut of a cutting reel unit. The system includes a cutting reel; a first frame supported on at least one support element that is supported on, and is movable along, the ground; and a second frame supporting the cutting reel. The system further includes an actuator that has a first portion connected to the first frame and a second portion connected to the second frame, wherein a distance between the first and second portions is adjustable. The actuator includes a motive mechanism that is activated to adjust the distance. The system can include at least one strut pivotally connected to the first frame and pivotally connected to the second frame on a second side of the second frame opposite to the first side. The strut extends between the first frame and the second frame. The strut defines the rotation of the second frame with respect to the first frame as the relative elevation of the second frame is adjusted with respect to the first frame.

5 Claims, 10 Drawing Sheets

U.S. PATENT DOCUMENTS

| | | |
|---|---|---|
| 5,291,724 A | 3/1994 | Cotton |
| 5,343,680 A | 9/1994 | Reichen et al. |
| 5,477,666 A | 12/1995 | Cotton |
| 5,533,326 A * | 7/1996 | Goman et al. ............... 56/7 |
| 5,678,396 A | 10/1997 | Thorman et al. |
| 5,682,735 A | 11/1997 | Swenson et al. |
| 5,732,538 A | 3/1998 | Thorman et al. |
| 5,970,690 A * | 10/1999 | Toman ............................ 56/7 |
| 6,044,637 A | 4/2000 | Thier et al. |
| 6,052,973 A * | 4/2000 | Tsuchihashi et al. ............. 56/7 |
| 6,318,059 B1 | 11/2001 | Cotton |
| 6,732,500 B1 * | 5/2004 | Myers ........................ 56/17.2 |
| 2002/0095922 A1 | 7/2002 | Goman et al. |
| 2004/0216436 A1 | 11/2004 | Schmidt et al. |
| 2004/0216438 A1 | 11/2004 | Poulson et al. |

\* cited by examiner

HEIGHT-OF-CUT ADJUSTMENT SYSTEM FOR REEL MOWER

TECHNICAL FIELD OF THE INVENTION

The invention relates to cutting reel units for mowers, and particularly mechanisms and methods for adjusting cutting reel units.

BACKGROUND OF THE INVENTION

Conventional mowing machines have an attached cutting reel unit or multiple units. Such machines typically move the cutting reel unit across the ground adjacent to the machine. Grass beneath the cutting reel unit is mowed as the machine travels forward. Conventional reel mower vehicles can include a plurality of arm members that extend from the vehicle, each arm having a cutting reel unit attached to its outer end portion.

The cutting reel units typically include front and rear skids or rollers that support or carry the cutting unit across the surface of the ground during mowing operation. Such vehicles and cutting reel units are disclosed for example in U.S. Pat. Nos. 5,343,680; 5,412,931 and 5,459,984.

Conventional cutting reel units provide a plurality of blades coupled together to form a generally cylindrical reel that rotates about a transverse axis. The blades pass in close proximity to a bedknife to create a scissoring action for cutting vegetation such as grass. A frame typically houses the reel and bedknife. Wheels, rollers or skids are coupled to the frame for engaging or rolling across the ground to operatively support the reel and bedknife at a predetermined height above the ground. The height at which grass is cut is therefore determined by the height at which the wheels, rollers or skids carry a frame, reel and bedknife above the ground. Cutting reel units are typically used for mowing golf courses or other areas were a relatively low and accurate cut is desirable.

To produce a high quality cut, and a cut that is even for multiple cutting reel units and across mowing passes by a machine with multiple cutting reel units, it is necessary that the height-of-cut on each cutting reel unit be properly adjusted. It is known that reel mowers have an adjustment mechanism for adjusting the reel mowing height. One type of height adjustment mechanism utilizes a plurality of vertically aligned holes for a cutting unit frame. The rollers are coupled to a mounting member or plate that includes an opening. The mounting plate is coupled to the frame by insertion of a pin through both the mounting plate opening and one of the holes defined by the cutting unit frame. The cutting height can be varied by inserting the pin through a different hole in the frame. Other types of height adjustment mechanisms utilize threaded bolts which set the adjustment height using nuts engaged on the bolts and positionable to support a portion of the frame such that the cutting reel unit is held securely in the desired vertical position with respect to the rollers. A wrench is used to adjust the nuts to positions on the bolts to thereby adjust the cutting height.

Another type of cutting reel unit utilizes a slotted mounting arm that is coupled with the rollers. A bolt received by the slot is used to adjust the height by loosening the bolt and shifting the slide-mounting arm to a new position.

For all height-of-cut adjustments, there is a generally accepted and common method for determining a cutting reel unit's existing height-of-cut and how far it needs to be adjusted towards a targeted adjustment. The procedure for setting the cutting height typically involves fastening a gauge bar to the bedknife such that the upper surface of the bar is parallel to a forward, horizontal position of the bedknife and at the desired distance below the cutting edge of the bedknife. The front and rear rollers are then adjusted to come into contact with the upper surface of the gauge bar.

The adjustment relationship between the front and rear rollers—relative to the cutting reel itself—is often termed the 'angle of attack' for the bedknife. This relationship refers to the relative pitch (front to back) or angle of the bedknife in relation to the ground surface. The angle of bedknife attack is an important parameter which affects the cut quality and effectiveness. Varying the height-of-cut must take the angle of attack into consideration.

Reel adjustments are checked regularly and adjustments are conducted as a preventative measure to ensure optimum cut quality, as a reactive measure when poor cut quality is detected, and when reel damage occurs. Reel adjustments are also necessary when a cutting reel unit is "re-tasked," in effect, adjusted for cutting another type of grass or grass to be cut to a different height. For example, a cutting reel unit could be re-tasked from an adjustment appropriate for a golf course fairway to adjustment appropriate for a golf course green, the two areas having different grass height requirements. However, re-tasking a cutting reel unit is time-consuming. To avoid re-tasking cutting reel unit, many golf courses have cutting reel units or cutting machines which remain designated or set for a particular grass or area requirement, in effect, a designated group of cutting units for different areas of the golf course. This technique necessitates multiple cutting units or cutting machines. Multiple cutting units or machines can result in higher capital costs and maintenance costs.

The present inventors have recognized that proper mower adjustments are often hard to achieve through manual adjustment methods.

The present inventors have recognized that the reel height-of-cut adjustment is an adjustment that needs to be adjusted accurately and precisely, but is also difficult to adjust on individual mowing reels.

The present inventors have recognized that the accuracy and precision of these adjustments can be improved through automated adjustments. The present inventors have recognized that a need exists for dynamic adjustment and capability for multi-area mowers or mowers that are capable of mowing multiple areas.

The present inventors recognize the need exists to be able to re-task a cutting reel unit or units dynamically to allow a single machine to mow multiple area types with different cutting reel unit setup requirements.

The present inventors have recognized the need to improve the adjustment process to ensure a shorter required time, ease of adjustment, and improved reel operation quality.

The present inventors have recognized that the ease, speed, accuracy and precision of adjusting the height-of-cut of a reel cutting unit can be improved through automated adjustment.

SUMMARY OF THE INVENTION

The invention provides a system for adjusting height-of-cut of the reel of a cutting reel unit. The cutting reel unit can be carried by, or attached to, a vehicle, such as a tractor, singularly or as one of a plurality of cutting reel units, or can be incorporated into a riding mower, a walking mower or a ride-on mower, also singularly or as one of a plurality of cutting reel units.

The system includes a cutting reel; a first frame supported on at least one support element that is supported on, and is movable along, the ground; and a second frame supporting the cutting reel. The cutting reel can be one driven in rotation by one or more hydraulic motors, electric motors, by the traction drive of the mower machine or vehicle, or by other type drive.

The system further includes an actuator that has a first portion connected to the first frame and a second portion connected to the second frame, wherein a distance between the first and second portions is adjustable. The actuator includes a motive mechanism that is activated to adjust the distance.

The motive mechanism is preferably a stepper motor and a lead screw mechanism driven to extend or retract by the stepper motor and the motor and lead screw operatively connected to the first and second portions.

Preferably, the actuator is one of two actuators, one actuator located at each end of the reel, and the actuators each having a first portion connected to the first frame and a second portion connected to the second frame, wherein a distance between the first and second portions is adjustable, and including a motive mechanism that is activated to adjust the distance.

The system can include a precise position sensor, and a controller, the precise position sensor signal-connected to the controller, the controller signal-connected to the actuator to precisely adjust the distance based on a position signal from the sensor.

The sensor can comprise an optical encoder having a read head signal-connected to the controller and an optical disk arranged to rotate with an output shaft of the stepper motor.

The system can include at least one strut pivotally connected to the first frame and pivotally connected to the second frame. The strut length between pivotal connections to the first and second frames, defines the slight rotation of the second frame with respect to the first frame to change the "angle of attack," or approach angle of the reel and bedknife to the blades of grass, to be at an advantageous angle over the range of the height-of-cut adjustment.

Preferably, the at least one strut comprises two struts, one of the two struts located on each end of the second frame. Each strut is pivotally connected to the first frame and pivotally connected to the second frame.

According to one embodiment, the at least one support element comprises a first roller and a second roller, and the first frame comprises a spaced-apart pair of plate assemblies that are connected together on a rear side by the first roller and connected together on a front side by the second roller. The second frame comprises a spaced-apart pair of mounting plates that are connected together by the cutting reel, the mounting plates located between the plate assemblies. The struts are each pinned to one of the plate assemblies at a rear location thereon and to an adjacent one of the mounting plates at a front location thereon.

According to the embodiment, each of the plate assemblies is adjustable in horizontal dimension in order to mount additional accessories, such as a conditioner. An accessory can be a device which contacts or manipulates the grass immediately before it is cut by the reel and bedknife.

The disclosed invention provides advantages in that the system allows for rapid and automatic adjustment of the height-of-cut of a reel of a cutting reel unit without operator intervention following initiation of the adjustment. The reel can be adjusted in seconds. The method has speed and consistency advantages over manual adjustment, and does not require detection of poor cut quality in order to perform the automatic adjustment.

The system allows a cutting reel unit to be rapidly re-tasked to cut different grass heights for different areas of a golf course. The system allows a single cutting reel unit to be readily usable for multiple golf course areas.

By adjusting the height-of-cut automatically, the process may be accomplished more consistently without the presence of a skilled mechanic. Automated adjustment also provides the capability for the support of autonomous equipment.

The cutting reel unit control system can be implemented through a variety of control architectures such as distributed control or centralized control. The control protocol can be CAN, serial, or other control protocols.

The cutting reel unit height-of-cut adjustment can be automatically self-adjusting, including a control system that periodically corrects the height-of-cut.

The cutting reel unit height-of-cut adjustment can include a control system configured as a central controller or by controllers located at each cutting unit, or even by a local controller designated for each actuator. The cutting reel unit height-of-cut adjustment can be adjusted after operator or automatic initiation of an adjustment routine in a central controller or by operator or automatic initiation of control routines performed by controllers at each cutting unit or at each actuator.

The cutting reel unit height-of-cut adjustment can be made by a controller external to the cutting unit, such as by a control unit that is used in a shop to re-adjust or re-task a cutting unit for a pre-selected grass condition or area and desired height-of-cut.

Alternatively to operator initiation, the cutting reel height-of-cut adjustment can also be initiated by a controller or control units that is/are responsive to a sensor such as a height of grass sensor, or by a location sensor and/or sender on the cutting unit or cutting machine that communicates with an external ground-based system or a global positioning system (GPS). These systems, responsive to external conditions, along with the onboard control systems as described herein facilitate implementation of the height-of-cut adjustment system in either a manned cutting machine or an autonomous cutting machine.

For example, different areas of a golf course could be mapped electronically and preprogrammed into an onboard or remote controller and such controller could communicate with the external positioning system and thereafter adjust the actuators to adjust the height-of-cut for the type of grass, the area, and desired cut lines for corresponding areas of the golf course.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
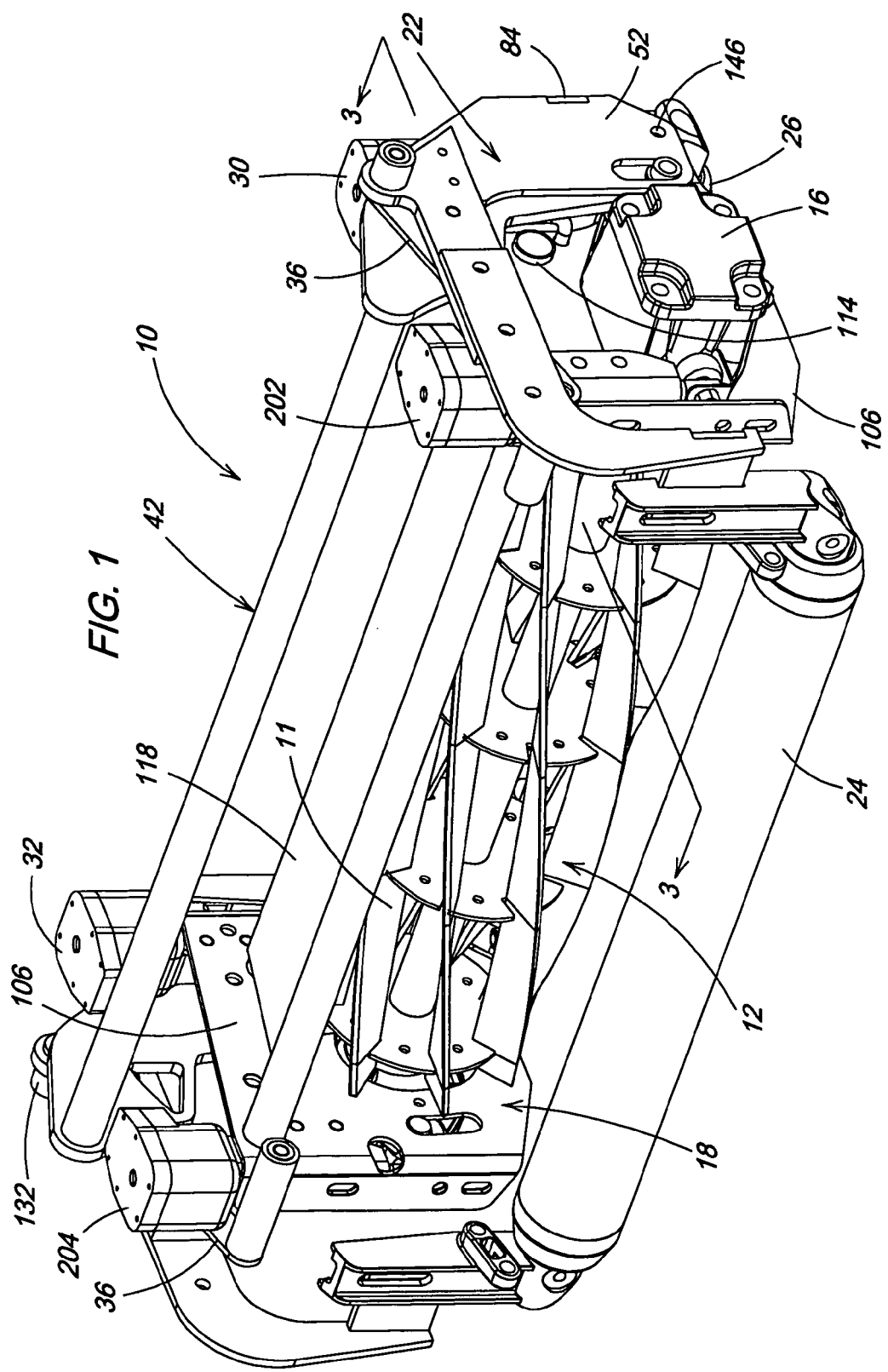
FIG. 1 is a perspective view of a cutting reel unit according to the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
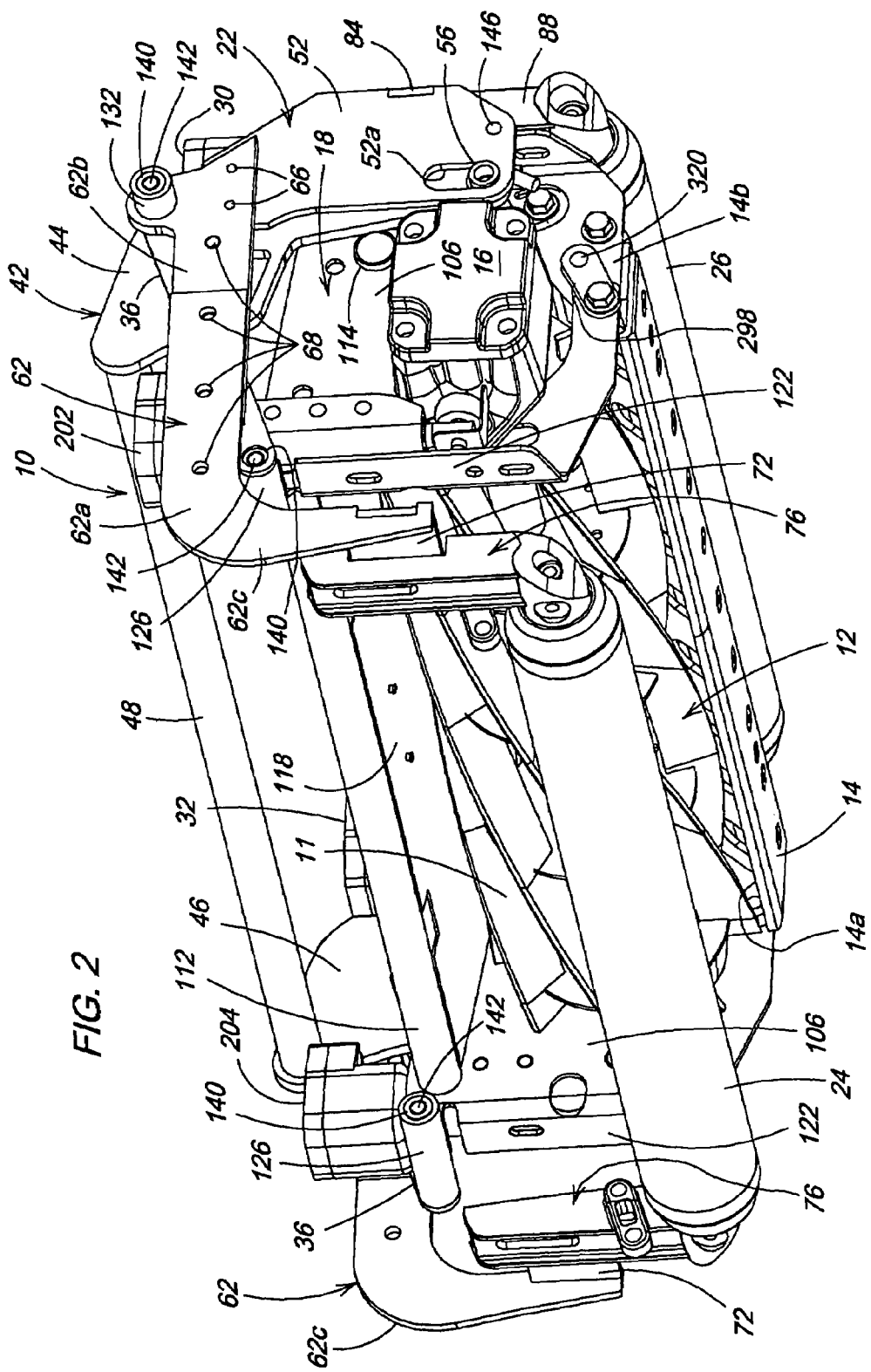
FIG. 2 is a bottom perspective view of the cutting reel unit of FIG. 1.

FIGS. 1 and 2 illustrate a mower cutting reel unit 10 according to the present invention. The mower cutting reel unit 10 is adapted to be pulled alone or within a group of like units by a vehicle such as described in U.S. Pat. Nos. 5,343,680; 5,412,931 or 5,459,984, herein incorporated by reference. A plurality of blades 11 are coupled together to form a generally cylindrical reel 12 which rotates about a transverse axis in close proximity to an edge 14a of a bedknife 14 (FIG. 2) for cutting vegetation, such as grass, with a scissoring action.

A motor 16, carried at one side of a frame 18 that generally houses and supports the reel 12, drives the reel 12. The motor 16 can be a hydraulic, electric or other type motor. Alternatively, a transmission arrangement between the traction drive of the machine or vehicle and the reel can be used to rotate the reel. A hydraulic motor is indicated in the figures.

The inside frame 18 is carried by an outside frame 22. The outside frame 22 is supported on front and rear rollers 24, 26 respectively. The inside frame 18 is supported on the outside frame 22 by actuators 30, 32 and by struts 36, 36. The struts 36, 36 are substantially mirror-image identical in configuration. A pushing or towing frame 42 is arranged between the inner and outer frames 18, 22. The towing frame 42 includes vertical plates 44, 46 fastened to side plates 52, 54 of the outer frame 22 by pins 56, 58 residing in slots 52a, 54a. The slots 52a, 54a are part of a mechanism which permits the reel to be pushed from the rear when rolling, and still touch down heel first when lowered.

A crossbar 48 connects the side plates 44, 46. A vehicle connector or lift arm can be engaged at a select position along the crossbar 48 to tow or push the cutting unit 10 along the ground during the cutting operation.

The outside frame 22 also includes adjustable bracket members 62, 62 connected by fasteners 66 to a respective side plate 52, 54. The bracket members 62, 62 are substantially mirror-image identical in configuration. The bracket members 62, 62 each include a short L-shaped member 62a and a horizontal member 62b. The members 62a, 62b include a series of holes 68 wherein a registered pair of holes between the members is selectable to set a horizontal overall dimension of the bracket members 62, 62 using fasteners through the registered pair of holes. The selectable dimension is useful where additional accessories are to be used, for example a conditioner, or a device that contacts and manipulates the grass immediately before it is cut by the reel and bedknife, could be added to the unit 10 behind the roller 24. The unit 10 is shown with holes 68 selected to set a maximum horizontal dimension of the bracket members 62, 62 such as would be used when a further front roller (not shown) would be installed behind the front roller 24. With just the front roller 24 used, different holes 68 would preferably be selected to set a minimum horizontal dimension of the bracket members 62, 62. Vertical portions 62c, 62c of the members 62, 62 extend downward to be connected via plates 72, 72 to front support assemblies 76, 76 that are supported by the front roller 24. The front support assemblies 76, 76 are substantially mirror-image identical in configuration.

Plates 84, 84 connect the outer frame side plates 52, 52 to rear support assemblies 88, 88 that are supported by ends of the rear roller 26. The rear support assemblies 88, 88 are substantially mirror-image identical in configuration.

The inside frame 18 includes side plates 106,106 connected together by crossbars 112, 114. The side plates 106,106 are substantially mirror-image identical in configuration. A grass deflector plate 118 is arranged between the bars 112,114 above the reel 12. The side plates each include a front flange 122. A tube 126 is welded to each of the front flanges 122. A tube 132 is also welded to each of the members 62b. Sleeve bearings 140 are fit into each tube and a pin, bolt or other fastener 142 is used to pivotally connect each of the angled struts 36 to a respective pair of tubes 126, 132.

Figure 3:
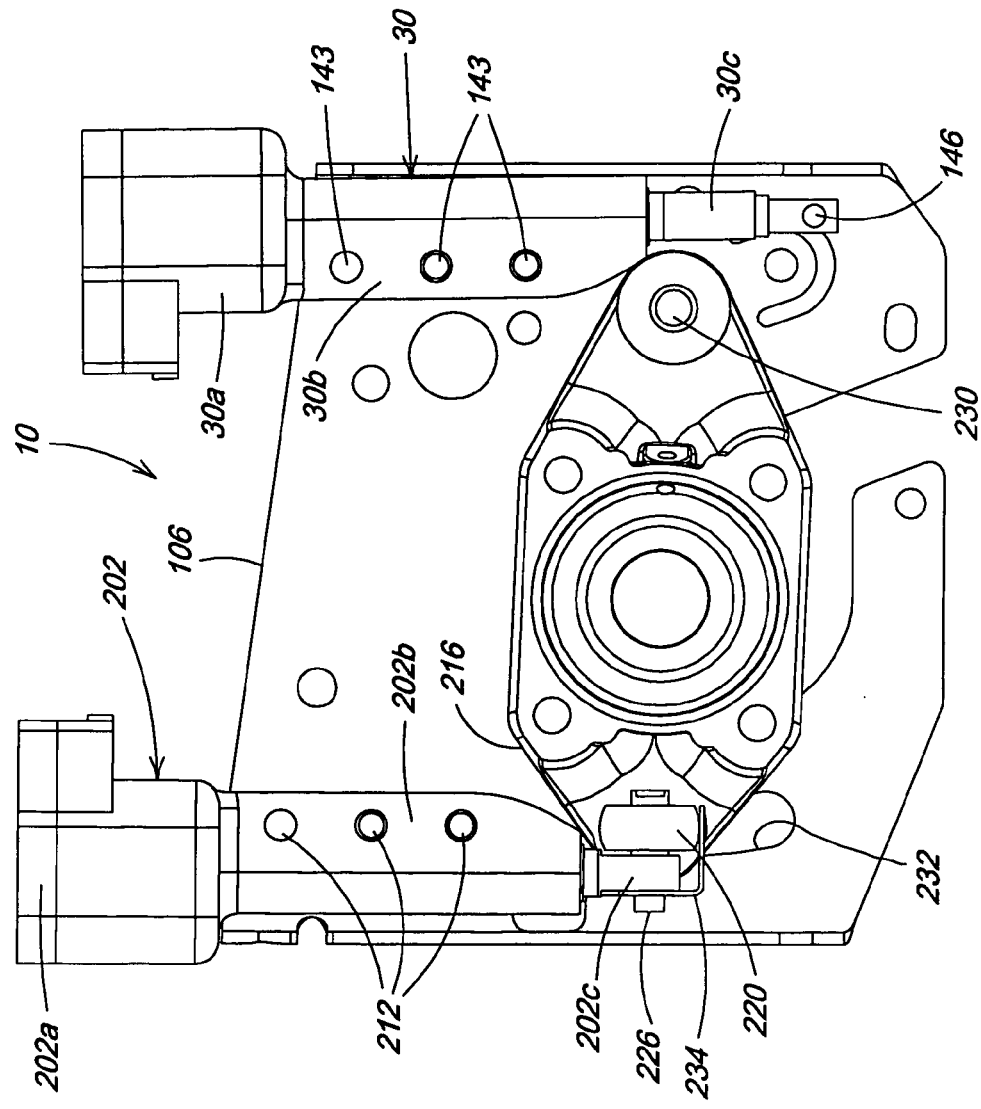
FIG. 3 is a fragmentary sectional view taken generally along line 3—3 of FIG. 1, with portions of the cutting unit removed for clarity of description.

FIG. 3 illustrates right side components of the unit 10. The left side components are configured in substantially the same, but mirror-image manner. The actuators 30, 32 each include a motor drive 30a, a housing 30b, and an actuator rod 30c extending out of a-bottom of the housing 30b. The rod 30c extends or retracts vertically from the housing 30b by a selected turning direction of the motor drive 30a. The housing 30b is fastened to the respective side plate 106 by fasteners 143. The rod 30c is pivotally fastened to the outer frame 22, particularly to the respective outer frame side plate 52 by a fastener or pin 146.

Thus, extension of the rods 30c from the housings 30b, of the actuators 30, 32, lifts the inside frame 18 with respect to the outside frame 22. Retraction of the rod 30c into the housing 30b, of the actuators 30, 32, lowers the inside frame 18 with respect to the outside frame 22.

The struts 36, 36 (FIGS. 1 and 2) prevent excessive forward or rearward tipping of the inside frame 18 lifted or lowered at the rear thereof and ensures a substantially straight vertical lifting or lowering of the inside frame 18. The geometry of the frames 18, 22, struts 36, 36 and actuators 30, 32 advantageously slightly tip the reel and bedknife forward with rising height-of-cut. This change in the "angle of attack" results in a more effective cutting.

Figure 3A:
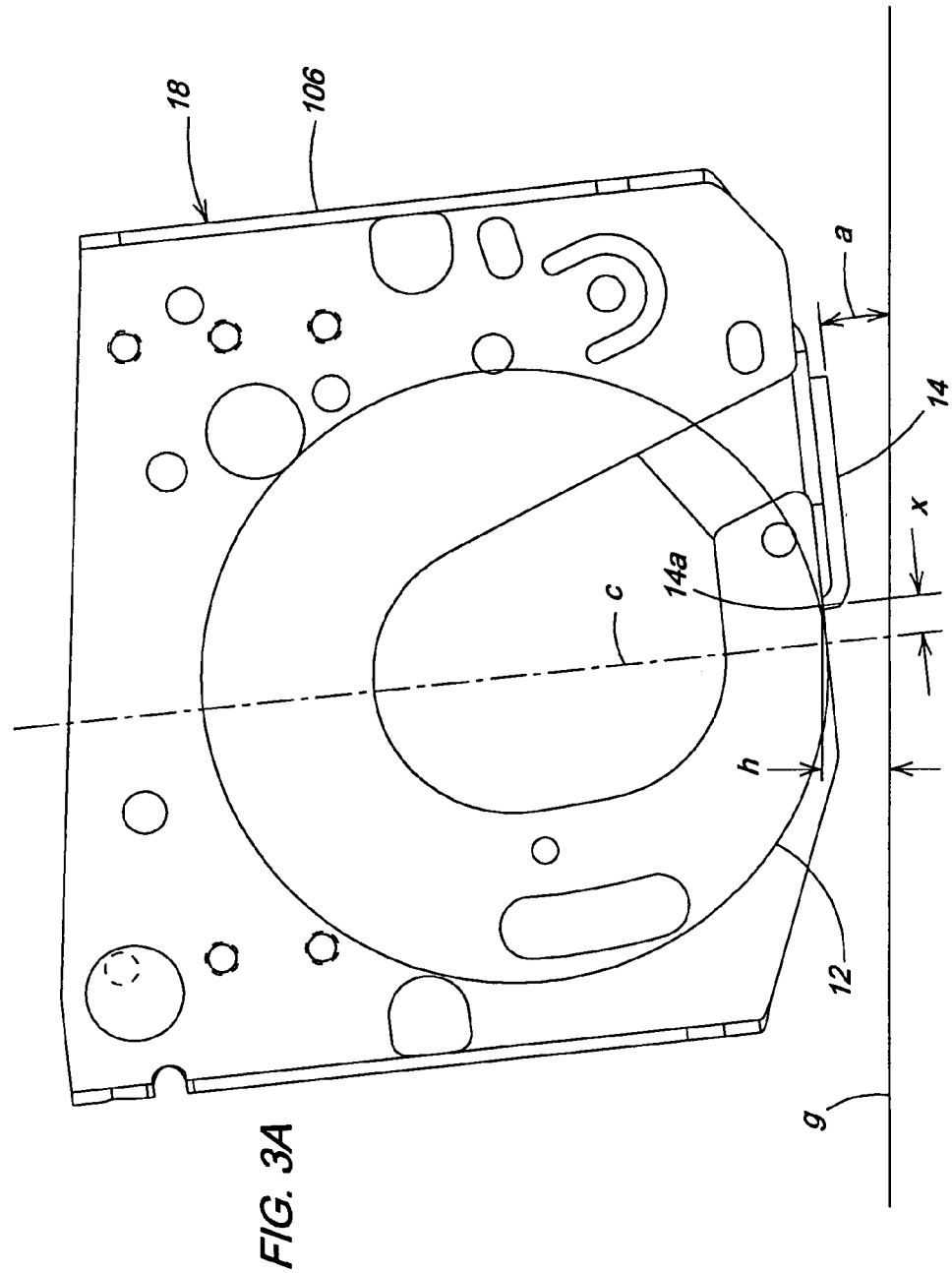
FIG. 3A is a schematic view of a reel position with respect to a bedknife position.

FIG. 3A illustrates schematically the side plate 106 and a profile outline of the reel 12 wherein the height-of-cut "h" from grade "g" and an offset "x" from the reel centerline "c" are shown. The attack angle "a" is also shown. Effective guideline maximum attack angles "a" with respect to height-of-cut are:

"h"=6 mm, "a"=0 deg
"h"=20 mm, "a"<1.3 deg
"h"=75 mm, "a"<5 deg

The preferred embodiment of the invention satisfies these guidelines.

For the preferred embodiment, the table below sets forth the relative positioning of the profile of the edge 14a with respect to the reel centerline "c" as the inside frame 18 is lifted through a range of height-of-cut "h" and tilted over a range on attack angles "a".

| "h" | "a" | "x" |
|---|---|---|
| 10 mm | 0.38 deg | 6.95 mm |
| 15 mm | 0.81 deg | 7.38 mm |
| 20 mm | 1.20 deg | 7.77 mm |
| 25 mm | 1.55 deg | 8.12 mm |
| 30 mm | 1.86 deg | 8.43 mm |
| 35 mm | 2.13 deg | 8.70 mm |
| 40 mm | 2.36 deg | 8.93 mm |
| 45 mm | 2.56 deg | 9.13 mm |
| 50 mm | 2.72 deg | 9.29 mm |
| 55 mm | 2.86 deg | 9.43 mm |
| 60 mm | 2.95 deg | 9.52 mm |
| 65 mm | 3.02 deg | 9.59 mm |
| 70 mm | 3.05 deg | 9.62 mm |
| 75 mm | 3.06 deg | 9.63 mm |

Actuators 202, 204 are provided on a front side of the inside frame 18 adjacent opposite ends of the reel 12. The actuators 202, 204 each include a motor actuator 202a, a housing 202b, and an actuator rod 202c. The housing 202b is fastened to the respective side plate 106 by fasteners 212. The rods 202c, 202c are fastened to respective reel bearing housings 216, 216 that journal the reel 12 at opposite ends of the inside frame 18. Each rod 202c is pinned to a ball joint 220 that is fixed to the respective housing 216, by an elongated pin 226.

Each reel bearing housing 216 is pinned to a respective side plate 106 by a pin or fastener 230. The extension or retraction of the rod 202c with respect to the housing 202b, of the actuators 202, 204 pivots the reel bearing housing 216 about the pin or fastener 230. By extending the rod 202c and pivoting the reel housings 216, 216, the blades 11 can be brought closer to or further from the bedknife 14 (FIG. 2), particularly, closer to or further from an edge 14a of the bedknife 14.

Figure 7:
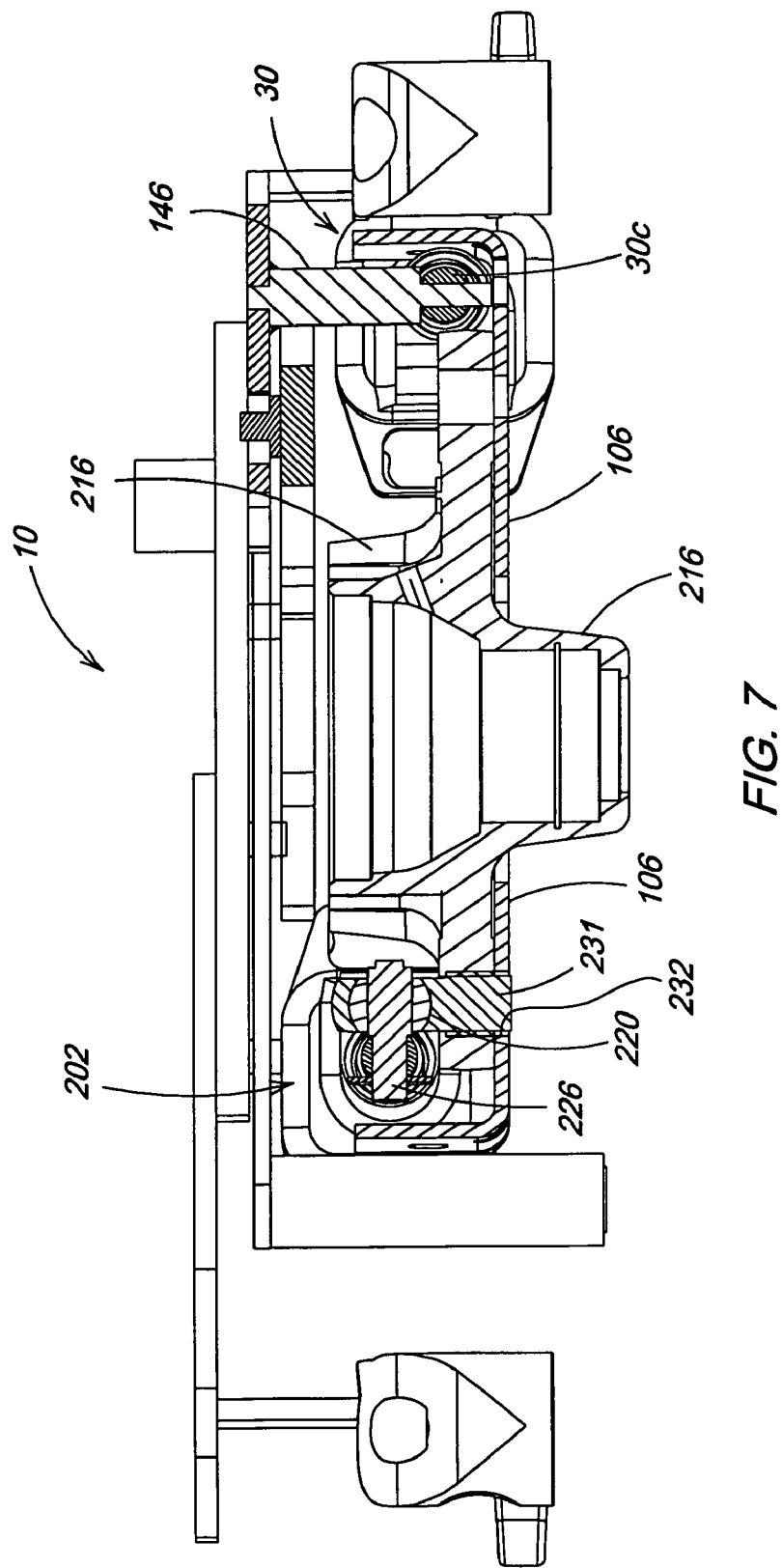
FIG. 7 is a fragmentary, partial sectional view taken generally along offset line 7—7 of FIG. 5.
Figure 8:
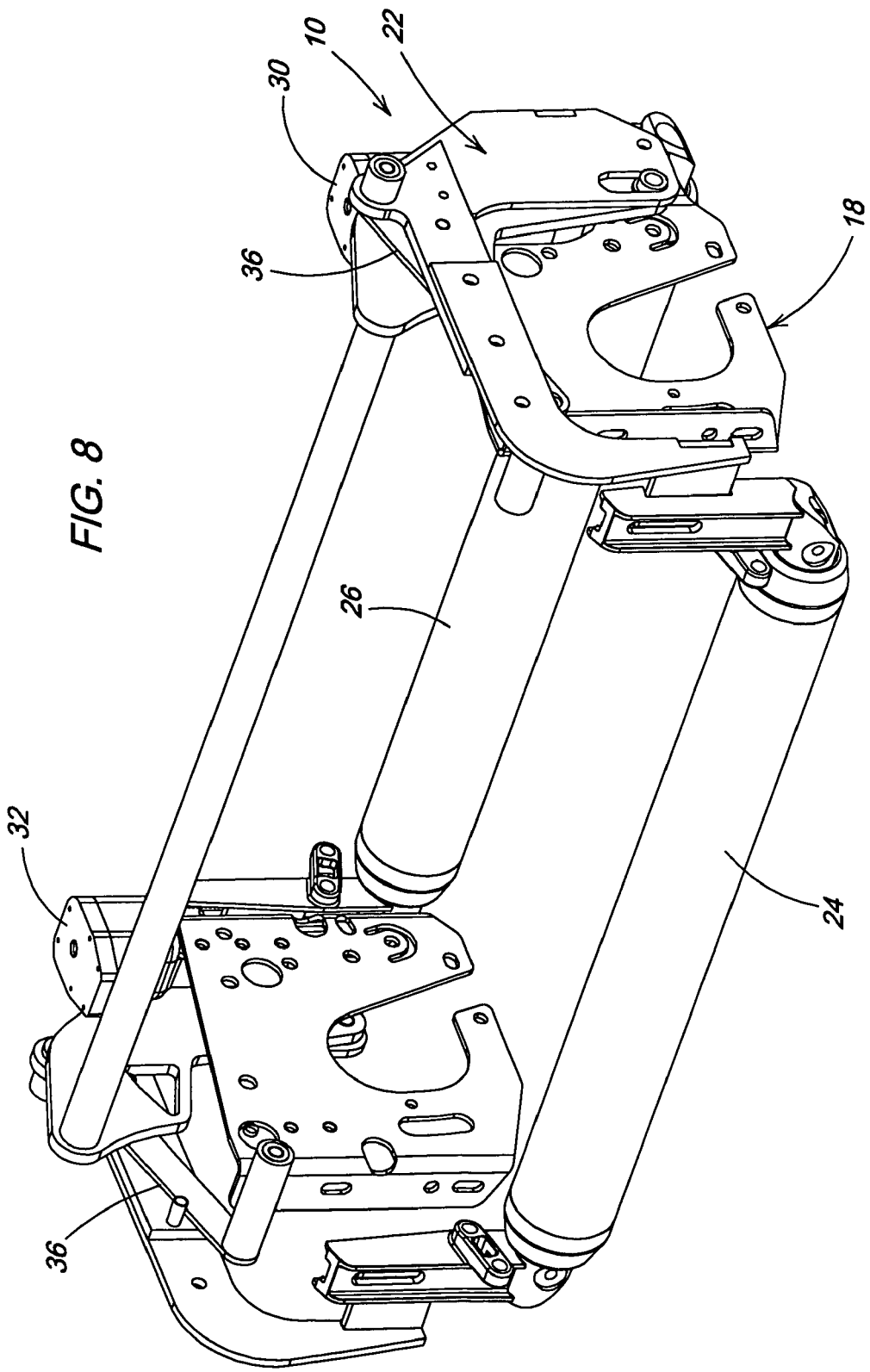
FIG. 8 is a perspective view of the unit shown in FIG. 1 with the reel removed for illustrating underlying parts.

The ball joint 220 is carried on the base pin 231 (FIG. 7). The base pin is fixed to the bearing housing 216 and extends through the bearing housing to slide through a slot 232 formed in the side plate 106. For each actuator 202, 204, an L-shaped spring 234 is fixed to the rod 202c and presses against the ball joint 220 to bias the rod 202c in the downward direction, to remove play in the ball joint 220.

Figure 4:
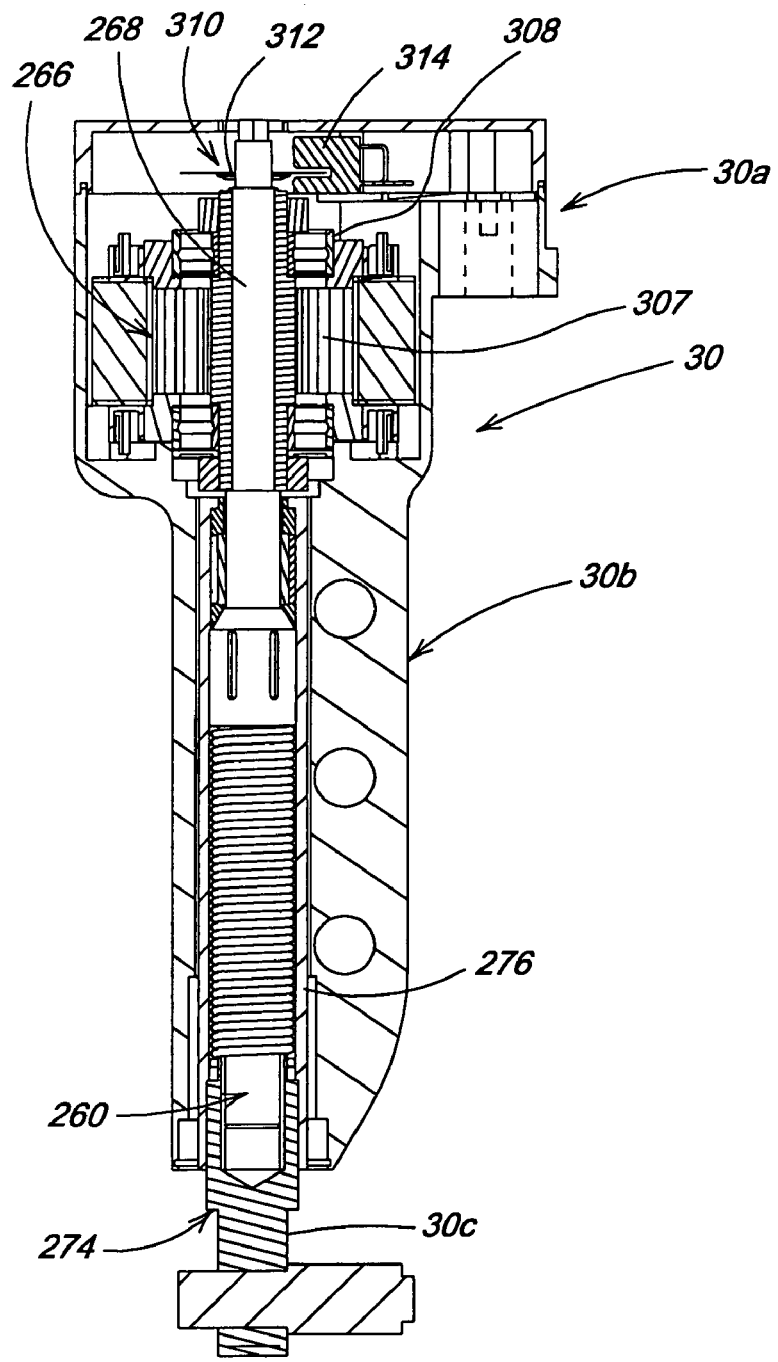
FIG. 4 is a sectional view of an actuator as shown in FIG. 3.

FIG. 4 illustrates a typical actuator 30, 32 such as the actuator 30. The actuator 30 includes the motor drive 30a, the housing 30b and the rod 30c. Inside the housing 30b there is a lead screw 260 that is driven into rotation by a stepper motor 266 of the motor drive 30a. The lead screw 260, being an extension of a motor shaft 268, is rotated by the stepper motor 266.

The rod 30c is a substantially hollow cylinder and includes a rod end portion 274 fixed to a rod body portion 276 by threaded mutual engagement. The lead screw 260 extends substantially through the body portion 276. A lead nut 280 is fixed to the rod body portion 276. The lead nut 280 can include an outer metal casing 282, such as brass, and an inner sleeve 284, such as plastic, having internal Acme threads engaged to corresponding external Acme threads on the lead screw 260. The lead screw 260 can be stainless steel.

Alternatively, the lead nut could be formed as a unitary part with the rod body portion 276, such as both being formed of plastic or metal.

The motor drive 30a includes windings 307, bearings 308, and an optical encoder 310. The encoder 310 includes a target 312 and a read head 314. The read head 314 includes two spaced-apart light emitting and reading devices, used to determine position of the rotating target disk and also its direction of rotation. To set absolute position of the rod, the rod can be extended or retracted by the stepper motor 266 to maximum or minimum extension, until the motor 266 stalls. At this position, the encoder will send no more pulses to the controller since the target disk stops rotating. This sets the maximum or minimum extension. The stepper motor 266 can then be reversed and selectively driven a pre-selected amount to properly position the rod end portion 274.

The actuators 202, 204 can be similarly configured as the actuators 30, 32 except provision for eliminating backlash is preferred for these actuators 202, 204 given the more fine accuracy of position required for reel-to-bedknife clearance adjustment. Such provision is disclosed in U.S. Ser. No. 10/427,720, identified by attorney docket number 6270P0300US filed on the same day as the present application and herein incorporated by reference.

Figure 5:
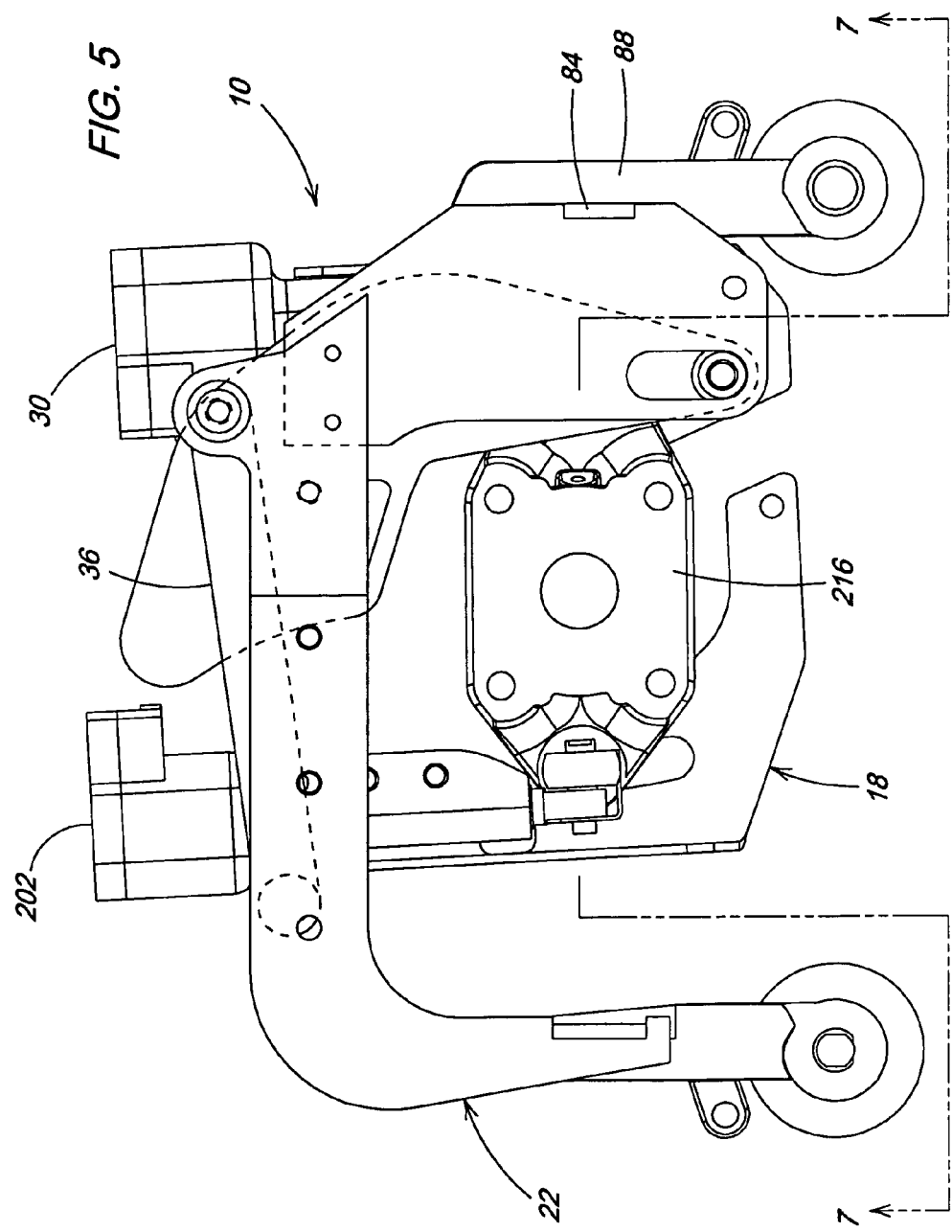
FIG. 5 is a side view of the cutting unit shown in FIG. 1 with portions removed for clarity of description wherein the reel is illustrated in an elevated operating position.
Figure 6:
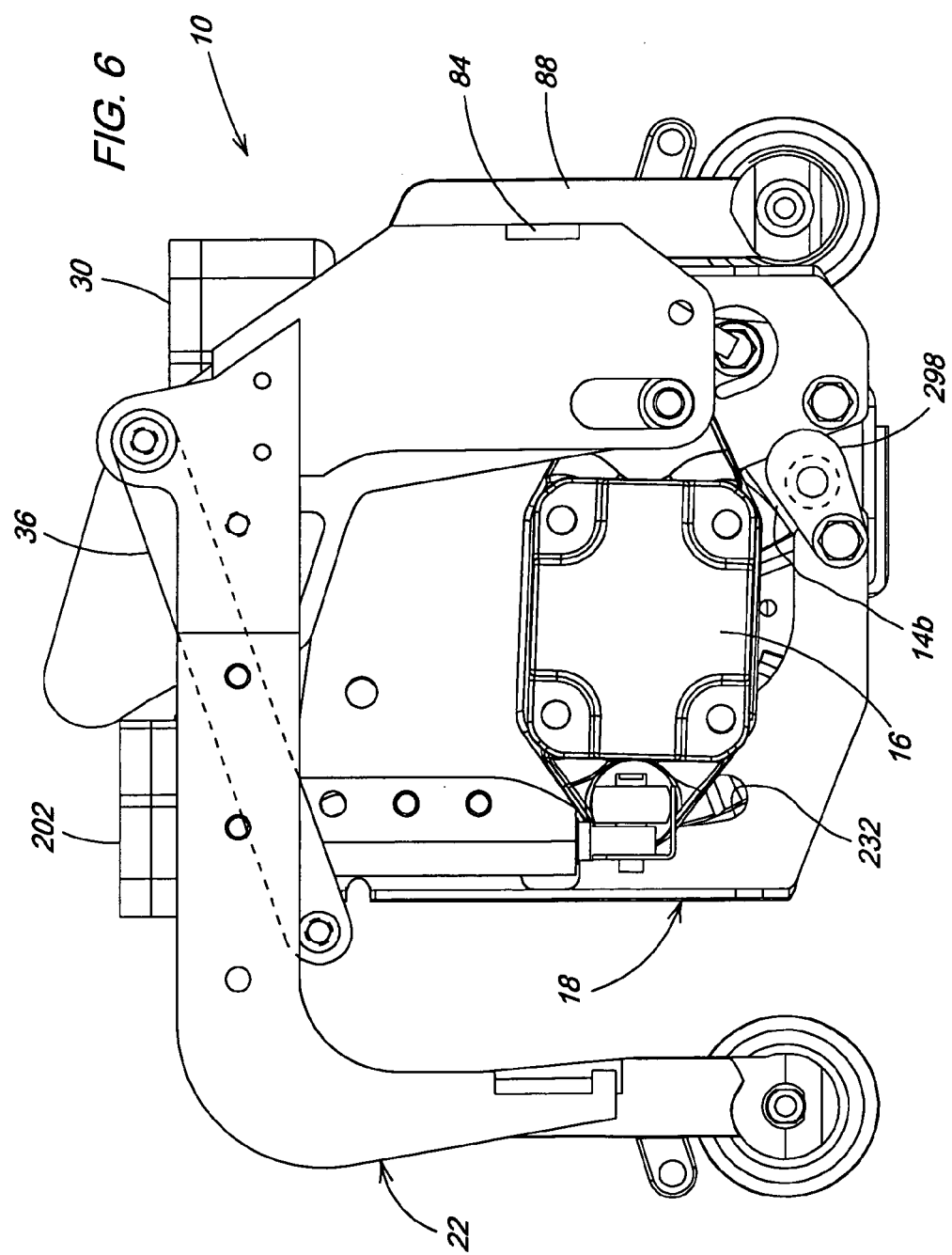
FIG. 6 is a side view of the unit shown in FIG. 1 wherein the reel is illustrated in a lowered operating position.

FIGS. 5 through 8 illustrate further views of the unit 10 with different components removed for clarity of description. FIG. 5 illustrates the inside frame 18 in a low position with respect to the outside frame 22. FIG. 6 illustrates the inside frame 18 in a raised position with respect to the outside frame 22.

Figure 9:
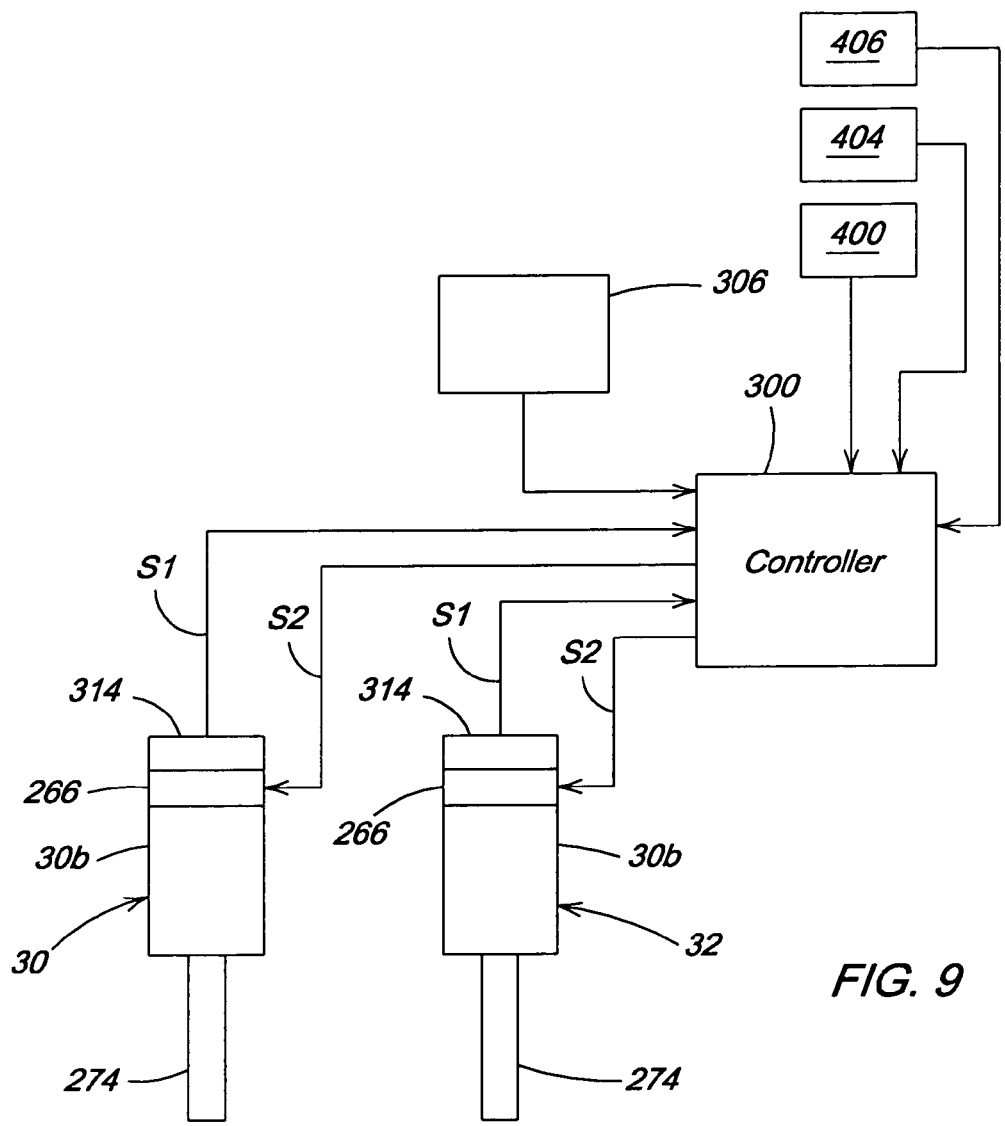
FIG. 9 is a schematic diagram of a control system of the present invention.

FIG. 9 illustrates a controller 300, such as a microprocessor, used to control the actuators 30, 32. An operator input station 306 such as a keypad is provided for giving instructions to the controller 300.

The operator, via the input station 306, or the controller responsive to an automatic routine, can command adjustment of the height-of-cut, by inputting a height-of-cut dimension, such as in mm. The actuators 30, 32 can be adjusted individually to set a desired lateral degree of the height-of-cut level, such as to ensure a level cut. A position signal S1 from each actuator read head 314 is communicated to the controller 300, and an appropriate drive signal S2 is sent to the stepper motor 266 of each actuator via appropriate signal conditioning and/or amplification to position rod end portions 274 with respect to the respective actuator body 30b of the actuators 30, 32.

The adjustments of the invention can all be automatically accomplished at the direction of the controller after initiation by an operator. Although the adjustments as set forth above are described as being operator initiated, the adjustments can also be initiated automatically during operation, or initiated periodically by the controller, or initiated by a change in reel tasking, i.e., a new type of grass or length of grass to be cut. This change in reel tasking can be initiated by a sensed signal or a remote signal such as from a grass height sensor 400, or from a signal from a ground-based system 404 or a GPS based position system 406.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In a lawn mowing apparatus, a system for adjusting the height-of-cut of a cutting reel unit to a lawn to be cut, comprising:
   a cutting reel having grass-cutting blades for cutting growing grass;
   a bedknife;
   a cutting line defined at an interface between the cutting reel and the bedknife;
   a first frame supported on at least one support element that is supported on, and is movable along, the ground;
   a second frame supporting said cutting reel and said bedknife;
      a first actuator having a first portion connected to the first frame and a second portion connected to said second frame, wherein relative positions of said first and second portions are adjustable to raise and lower portions of said second frame with respect to said first frame, and including a powered motive mechanism that is activated to adjust said relative positions over a selectable range to set a pre-selected elevation of said cutting line; and
   a controller that is signal-connected to said first actuator, said controller operable to change said relative positions such that said elevation of said cutting line is set close to a surface of said lawn to be cut and corresponds to a selected height-of-cut.

2. The system according to claim 1, wherein said powered motive mechanism comprises an electrical stepper motor with an output shaft, and a lead screw mechanism operatively connected to said output shaft and driven to extend or retract by rotation of said output shaft of said stepper motor, said stepper motor connected to one of said first or second frames and said lead screw mechanism connector to a respective other of said first or second frames.

3. The system according to claim 1, comprising a second actuator having a first portion connected to the first frame and a second portion connected to said second frame, wherein relative positions of said first and second portions are adjustable to raise and lower portions of said second frame with respect to said first frame, and including a powered motive mechanism that is activated to adjust said relative positions over a selectable range to set a pre-selected elevation of said cutting line, one of said first and second actuators located at each end of said reel.

4. The system according to claim 1, comprising a position sensor, said position sensor signal-connected to said controller, said controller signal-connected to said actuator to adjust said relative positions based on a position signal from said sensor.

5. The system according to claim 1, wherein said first and second portions are located in substantial vertical alignment on a rear side of said second frame, and said system comprising a pair of angular struts pivotally connected to said rear side of said first frame and to a front side of said second frame.

* * * * *